(12) United States Patent
Ramsay et al.

(10) Patent No.: US 12,372,968 B2
(45) Date of Patent: Jul. 29, 2025

(54) AUTONOMOUS MACHINE NAVIGATION IN LOWLIGHT CONDITIONS

(71) Applicant: THE TORO COMPANY, Bloomington, MN (US)

(72) Inventors: Michael Jason Ramsay, Verona, PA (US); David Arthur LaRose, Rochester Hills, MI (US); Zachary Irvin Parker, Pittsburgh, PA (US); Matthew John Alvarado, Mars, PA (US); Stephen Paul Elizondo Landers, Pittsburgh, PA (US); David Ian Robinson, Hawke's Bay (NZ)

(73) Assignee: THE TORO COMPANY, Bloomington, MN (US)

( * ) Notice: Subject to any disclaimer, the term of this patent is extended or adjusted under 35 U.S.C. 154(b) by 911 days.

(21) Appl. No.: 17/439,465

(22) PCT Filed: Apr. 9, 2020

(86) PCT No.: PCT/US2020/027471
§ 371 (c)(1),
(2) Date: Sep. 15, 2021

(87) PCT Pub. No.: WO2020/210493
PCT Pub. Date: Oct. 15, 2020

(65) Prior Publication Data
US 2022/0151144 A1 May 19, 2022

Related U.S. Application Data

(60) Provisional application No. 62/831,347, filed on Apr. 9, 2019.

(51) Int. Cl.
G05D 1/00 (2024.01)
A01D 34/00 (2006.01)
(Continued)

(52) U.S. Cl.
CPC ......... G05D 1/0246 (2013.01); A01D 34/008 (2013.01); G06T 7/80 (2017.01);
(Continued)

(58) Field of Classification Search
CPC ............. G05D 1/0246; A01D 34/008; A01D 2101/00; G06T 7/80; G06V 10/42;
(Continued)

(56) References Cited

U.S. PATENT DOCUMENTS 7,626,614 B1 * 12/2009 Marcu ................... H04N 23/741
348/222.1
8,767,091 B2 * 7/2014 Bell ....................... H04N 23/71
348/222.1

(Continued)

FOREIGN PATENT DOCUMENTS

CN    101346987 A    1/2009
CN    107637064 A    1/2018
(Continued)

OTHER PUBLICATIONS

U.S. Appl. No. 62/818,893, filed Mar. 15, 2019, Frick et al.
(Continued)

*Primary Examiner* — Tyler J Lee
*Assistant Examiner* — Matthew John Moscola
(74) *Attorney, Agent, or Firm* — Mueting Raasch Group

(57) ABSTRACT

Autonomous machine (100) navigation techniques include using simulation to configure camera (133) capture parameters. A method may include capturing image data of a scene, generating irradiance image data, determining at least one test camera capture parameter, determining a simulated scene parameter, and generating at least one updated camera capture parameter. Image data for camera capture configuration may be captured while the autonomous machine is moving. Camera (133) captures parameters may be used to
(Continued)

capture images while the autonomous machine (100) is slowed or stopped, particularly in lowlight conditions.

21 Claims, 9 Drawing Sheets

(51) Int. Cl.
  *A01D 101/00*  (2006.01)
  *G06T 7/80*  (2017.01)
  *G06V 10/42*  (2022.01)
  *G06V 20/10*  (2022.01)
  *G06V 20/56*  (2022.01)
  *H04N 5/58*  (2006.01)
  *H04N 23/73*  (2023.01)

(52) U.S. Cl.
  CPC .............. *G06V 10/42* (2022.01); *G06V 20/10* (2022.01); *G06V 20/56* (2022.01); *H04N 5/58* (2013.01); *H04N 23/73* (2023.01); *A01D 2101/00* (2013.01)

(58) Field of Classification Search
  CPC .......... G06V 20/10; G06V 20/56; H04N 5/58; H04N 23/73; H04N 17/002; H04N 23/64; H04N 23/695; H04N 23/74
  See application file for complete search history.

(56) References Cited

U.S. PATENT DOCUMENTS

| | | | |
|---|---|---|---|
| 8,958,939 | B2 | 2/2015 | Einecke et al. |
| 2008/0109126 | A1 | 5/2008 | Sandin et al. |
| 2014/0005933 | A1* | 1/2014 | Fong .................... G05D 1/0246 701/447 |
| 2015/0138339 | A1 | 5/2015 | Einecke et al. |
| 2017/0163878 | A1* | 6/2017 | Jiang ...................... H04N 23/64 |
| 2017/0303466 | A1 | 10/2017 | Grufman et al. |
| 2019/0004543 | A1* | 1/2019 | Kennedy ................ H04N 23/71 |
| 2019/0253701 | A1* | 8/2019 | Himel ..................... G01S 17/89 |
| 2020/0084375 | A1* | 3/2020 | Tadano .................. H04N 23/80 |
| 2021/0405654 | A1* | 12/2021 | Ulun ....................... G05D 1/101 |

FOREIGN PATENT DOCUMENTS

| | | | | |
|---|---|---|---|---|
| EP | | 2873314 A1 * | 5/2015 | .......... A01D 34/008 |
| WO | WO 2016098040 A1 | | 6/2016 | |

OTHER PUBLICATIONS

U.S. Appl. No. 16/534,515, filed Aug. 7, 2019, Frick et al.
U.S. Appl. No. 62/831,347, filed Apr. 9, 2019, Ramsay et al.
International Patent Application No. PCT/US2020/027471, filed Apr. 9, 2020, International Search Report and Written Opinion, mailed Aug. 28, 2020, 11 pages.
International Patent Application No. PCT/US2020/027471, filed Apr. 9, 2020, International Preliminary Report on Patentability, dated Sep. 28, 2021, 8 pages.
Meilland et al., "3D High Dynamic Range Dense Visual SLAM and Its Application to Real-Time Object Re-lighting" Oct. 2013, *IEEE International Symposium on Mixed and Augmented Reality* (ISMAR), 143-152.
wikipedia.com [online], "IEEE 802.11" last updated on Mar. 22, 2023, retrieved on Mar. 24, 2023, retrieved from URL: wikipedia.org/wiki/IEEE_802.11, 19 pages.
Chinese Patent Application No. 202080027641.X, filed Oct. 9, 2021; Office Action issued Mar. 1, 2024. 9 pages.
Examination Report for Australian Application No. 2020271875, dated Sep. 5, 2024, 4 pages.

* cited by examiner

AUTONOMOUS MACHINE NAVIGATION IN LOWLIGHT CONDITIONS

The present application is a 35 U.S.C. § 371 U.S. National Stage of International Application No. PCT/US2020/027471, filed Apr. 9, 2020, which claims the benefit of U.S. Provisional Application Ser. No. 62/831,347, filed Apr. 9, 2019, both of which are incorporated by reference in their entireties.

The present disclosure generally relates to autonomous machine navigation and, in particular, autonomous machine navigation in lowlight conditions.

Various machines, such as ground maintenance machine for lawns and gardens, may perform a variety of tasks. For example, powered lawn mowers may be used by both homeowners and professionals alike to maintain grass areas within a property or yard. Some lawn mowers have the capability to autonomously perform grass cutting within a predefined boundary of a work region.

SUMMARY

Techniques of this disclosure generally relate to autonomous machines that incorporate a lowlight navigation system, which may be implemented in a controller or be part of an overall navigation system, to provide the machine with additional functionality. For example, the lowlight navigation system may provide or assist with detecting a lowlight environment (e.g., dark conditions during night, dawn, or dusk) and facilitating navigation in the lowlight environment. Navigation of the lowlight environment may include providing illumination when image recording. Although a strong illumination source may be used to facilitate continuous operation of an autonomous machine in lowlight conditions, illumination and/or long exposure times may be used in conjunction with slowing or stopping movement to facilitate lowlight navigation. Illumination may not be needed or used to navigate in some lowlight environments. Certain lowlight navigation techniques described herein, which may also be described as "slow and stare" or "stop and stare" techniques, may trade off mowing speed (e.g., continuous operation) for increased battery life and ease of manufacturability. Techniques including camera capture configuration may facilitate improved navigation at night, for example, by reducing the exposure time and reducing use of active illumination to capture a lowlight image for localization.

In independent aspect A1, a method for autonomous machine navigation includes capturing image data of a scene using one or more cameras configured with at least one camera capture parameter; generating irradiance image data based on the image data of the scene and calibrated irradiance map data; determining at least one test camera capture parameter based on the irradiance image data of the scene; determining a simulated scene parameter based on the irradiance image data and the at least one test camera capture parameter; and generating at least one updated camera capture parameter based on the at least one test camera capture parameter in response to determining that the simulated scene parameter is acceptable.

In aspect A2, aspect A1 further includes generating simulated image data of the scene based on the at least one test camera capture parameter. Determining the simulated scene parameter includes determining the simulated scene parameter further based on the simulated image data of the scene.

In aspect A3, any preceding A aspect further includes wherein determining the at least one test camera capture parameter includes determining the at least one test camera capture parameter further based on at least one previously stored camera capture parameter.

In aspect A4, any preceding A aspect further includes: determining a captured scene parameter based on the image data of the scene; determining whether the captured scene parameter is acceptable; using the at least one camera capture parameter for capturing a localization image in response to determining that the captured is acceptable; and generating the irradiance image data in response to determining that the captured scene parameter is not acceptable.

In aspect A5, aspect A4 further includes determining that the captured scene parameter is acceptable in response to the captured scene parameter exceeding a captured scene parameter threshold.

In aspect A6, aspect A4 or A5 further includes wherein the captured scene parameter includes one or more of the following: a mean pixel intensity, a median pixel intensity, or a weighted sum of pixel intensities.

In aspect A7, any one of aspects A4 to A6 further includes generating masked captured image data based on the image data of the scene in response to determining that the captured scene parameter is not acceptable; and generating the irradiance image data based on the masked captured image data.

In aspect A8, any preceding A aspect further includes generating masked simulated image data based on the simulated image data of the scene; and determining the simulated scene parameter based on the masked simulated image data.

In aspect A9, any preceding A aspect further includes determining that the simulated scene parameter is acceptable in response to the simulated scene parameter exceeding a simulated scene parameter threshold.

In aspect A10, any preceding A aspect further includes wherein the simulated scene parameter includes one or more of the following: a mean pixel intensity, a median pixel intensity, or a weighted sum of pixel intensities.

In aspect A11, any preceding A aspect further includes updating the at least one test camera capture parameter in response to determining that the simulated scene parameter is not acceptable; and generating simulated image data of the scene based on the at least one test camera capture parameter.

In aspect A12, any preceding A aspect further includes wherein the one or both of the at least one updated camera capture parameter and the at least one test camera capture parameter includes one or more of the following: exposure time, gain, and active lighting intensity.

In aspect A13, any preceding A aspect further includes wherein using the updated at least one camera capture parameter includes: in response to a calculated exposure time exceeding an exposure time threshold, using a reduced exposure time as a camera capture parameter that does not exceed the exposure time threshold, and using a gain as a camera capture parameter based on the calculated exposure time and the reduced exposure time.

In aspect A14, any preceding A aspect further includes using the at least one updated camera capture parameter in a subsequent capture of image data using the one or more cameras to configure the one or more cameras or to update a localization.

In aspect A15, any preceding A aspect further includes: capturing the image data of the scene during movement of the autonomous machine in lowlight conditions in a work region; determining whether to update a localization of the autonomous machine during movement of the autonomous machine; reducing movement of the autonomous machine in response to determining to update the localization; capturing an operational image of at least a portion of a work region in the lowlight conditions while the movement of the autonomous machine is reduced using the at least one updated camera capture parameter; updating a pose estimate of the autonomous machine based on the captured operational image; and resuming movement of the autonomous machine within the work region based on the updated pose estimate.

In aspect A16, any preceding A aspect further includes determining an uncertainty parameter based on a current pose; determining whether the uncertainty parameter exceeds an uncertainty threshold; reducing movement of the autonomous machine in response to the uncertainty parameter exceeding the uncertainty threshold and determining to update a localization of the autonomous machine; and capturing an operational image of at least a portion of a work region while the movement of the autonomous machine is reduced.

In aspect A17, aspect A16 further includes wherein the uncertainty threshold is determined based on a distance from a boundary of the work region.

In aspect B1, an autonomous machine includes a housing coupled to a maintenance implement; a propulsion system including at least one motor; at least one camera adapted to record images in one or more light conditions; and a controller operably coupled to the at least one camera and the propulsion system, the controller adapted to carry out a method according to any one of the A aspects.

In aspect C1, a computer-readable medium includes instructions stored thereon that, when executed by processing circuitry, cause the processing circuitry to perform a method according to any one of the A aspects.

In independent aspect D1, an autonomous machine includes a housing coupled to a maintenance implement; a propulsion system including at least one motor; at least one camera adapted to record images in one or more light conditions; and a controller operably coupled to the at least one camera and the propulsion system. The controller is adapted to: detect whether a lowlight condition exists; determine whether to update a localization of the autonomous machine; command the propulsion system to slow or stop movement of the autonomous machine in response to determining to update the localization and detecting a lowlight condition; command the at least one camera to record one or more images of a work region in the lowlight condition; update a pose estimate of the autonomous machine based on the one or more recorded images; and command the propulsion system to resume movement of the autonomous machine based on the updated pose estimate.

In aspect D2, aspect D1 further includes wherein the controller is further adapted to: compare image data based on the one or more recorded images recorded in the lowlight condition to daylight or lowlight feature data; and determine vision-based pose data based on the comparison of the image data to the daylight or lowlight feature data.

In aspect D3, aspect D2 further includes wherein the controller is further adapted to update the pose estimate of the autonomous machine based on the vision-based pose data.

In aspect D4, any preceding D aspect further includes wherein the controller is further adapted to determine an exposure time and/or additional illumination to record an image based on the detected light condition.

In aspect D5, aspect D4 further includes wherein the exposure time and/or additional illumination is determined based on a threshold such that feature matching can occur using a lowlight navigational map or between lowlight and daylight features.

In independent aspect E1, a method for autonomous machine navigation includes: detecting whether a lowlight condition exists; determining whether to update a localization of the autonomous machine; slowing or stopping movement of the autonomous machine in response to determining to update the localization and detecting the lowlight condition; recording an image of at least a portion of a work region in lowlight conditions; updating a pose estimate of the autonomous machine based on the recorded image; and resuming movement of the autonomous machine within the work region based on the updated pose estimate.

In independent aspect F1, a method for autonomous machine navigation includes: determining an uncertainty parameter based on a current pose; determining whether the uncertainty parameter exceeds an uncertainty threshold; slowing or stopping movement of the autonomous machine in response to the uncertainty parameter exceeding the uncertainty threshold and determining to update a localization of the autonomous machine; and recording an image of at least a portion of a work region while the autonomous machine is slowed or stopped.

The summary is not intended to describe each aspect or every implementation of the present disclosure. A more complete understanding will become apparent and appreciated by reference to the following detailed description and claims taken in view of the accompanying figures of the drawing.

BRIEF DESCRIPTION OF THE DRAWINGS

Exemplary embodiments will be further described with reference to the drawing, wherein.

Figure 1:
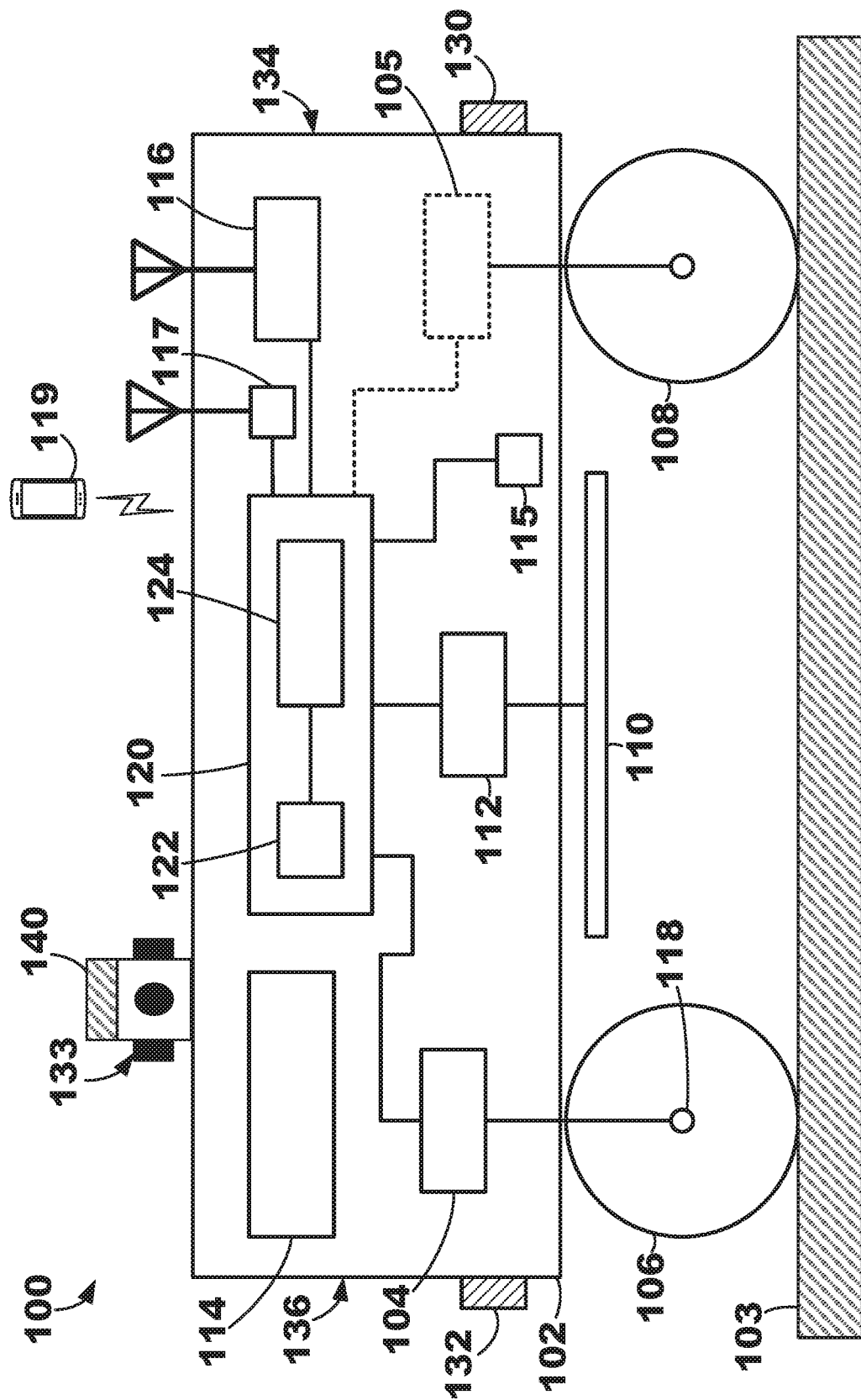
FIG. 1 is a schematic diagram of an autonomous working machine (e.g., ground working machine such as a robotic lawn mower) incorporating a vision system in accordance with the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "exactly" or "about." The term "or" is generally employed in its inclusive sense, for example, to mean "and/or" unless the context clearly dictates otherwise. The term "and/or" (if used) means one or all of the listed elements or a combination of any two or more of the listed elements. The term "i.e." is used as an abbreviation for the Latin phrase id est and means "that is." The term "e.g.," is used as an abbreviation for the Latin phrase exempli gratia and means "for example."

The present disclosure provides autonomous machines that incorporate a lowlight navigation system, which may be implemented in a controller or be part of an overall navigation system, to provide the machine with additional functionality. For example, the lowlight navigation system may provide or assist with detecting a lowlight environment (e.g., dark conditions during night, dawn, or dusk) and facilitating navigation in the lowlight environment. Navigation of the lowlight environment may include providing illumination when image recording. Although a strong illumination source may be used to facilitate continuous operation of an autonomous machine in lowlight conditions, illumination and/or long exposure times may be used in conjunction with slowing or stopping movement to facilitate lowlight navigation. Illumination may not be needed or used to navigate in some lowlight environments. Certain lowlight navigation techniques described herein, which may also be described as "slow and stare" or "stop and stare" techniques, may trade off mowing speed (e.g., continuous operation) for increased battery life and ease of manufacturability. Techniques including camera capture configuration may facilitate improved navigation at night, for example, by reducing the exposure time and reducing use of active illumination to capture a lowlight image for localization.

Techniques described herein may use photometric calibration (or a model) of an imaging camera system of the autonomous machine. This model may or may not be calibrated against each and every image sensor (imager), or a single model may be used for all imagers in the system.

Images may be captured while the machine is moving, even when there is significant motion blur due to the required long exposure times. The blurred images may be used, in conjunction with the imager model, to select an acceptable exposure, gain, and optionally an active lighting intensity parameter.

In some aspects, an image is captured and evaluated to determine if it is "well exposed." Evaluation may be performed in any suitable manner. In one example, a mean pixel intensity may be determined and compared to a mean pixel intensity threshold or band of acceptable ranges of mean pixel intensities. Other non-limiting examples include determining a median pixel intensity or a weighted sum of pixel intensities (e.g., spot weighting or area weighting), which may be compared to respective thresholds or bands of acceptable ranges. In some aspects, intensity may be also be described in relative terms, for example, as a percentile brightness.

If the image is well exposed, the camera capture parameters (or even the image itself) may be passed to an absolute localization algorithm. If the image is not well exposed, then the camera capture parameters may be improved before sending to the absolute localization algorithm.

In some aspects, image masks are applied to focus the image analysis on the relevant parts of the image. In one example, edges of the image related to seeing the machine and excessively high or low intensities may be masked.

The image may be converted from pixel intensities to irradiance units by applying the calibrated camera irradiance map. A camera irradiance map may be provided as a look up table (LUT) or function generated by a calibration test performed on one or more image sensors or camera boards. These measurements need only be performed once on a few camera modules and may generally apply to all cameras of that model. The camera irradiance map may relate the scene irradiance seen by each pixel to the pixel intensity recorded by each pixel. Such maps may facilitate estimation of scene brightness and simulation of an image if different parameters had been used, such as a longer exposure time.

Better camera capture parameters may be estimated by entering a search loop to simulate the pixel intensity image resulting from trial camera capture parameters. A simulated image is generated using different trial set camera capture parameters during the search loop. A weighting mask may be applied to focus the image analysis on the most important parts of the image. A determination may then be made to if it is "well exposed."

If the simulated image is well exposed, the camera capture parameters may be passed onto the absolute localization algorithm for capturing a new image. If the simulated image is not well exposed, then the search loop may continue to iterate to estimate better camera capture parameters. In some aspects, the search loop performs a binary search algorithm, gradient-based search algorithm, or any other suitable search algorithm to find a better set of camera capture parameters.

The machine may navigate using dead reckoning (DR) utilizing inertial sensors, wheel encoders, or other relative motion sensors to estimate the machine position, orientation, and velocity (or pose) and may also estimate a pose uncertainty. When the pose uncertainty is greater than a threshold measure, then the machine may slow down or stop to perform an absolute localization.

During absolute localization, the machine may capture one or more images leveraging the estimated acceptable exposure, gain, and lighting intensity parameters to capture one or more long exposure or high dynamic range (HDR) images. Capturing HDR images may include capturing multiple short exposure images at high gain, which may be stacked, or otherwise combined, to approximate a long exposure image based on the multiple images. In many cases, the first long exposure image is sufficient to localize, saving the time required for multiple exposures to tune the exposure, gain, and lighting intensity parameters.

The absolute localization from the images may provide a location and location uncertainty estimate. This location and location uncertainty estimate may be used to improve the pose estimate and the pose uncertainty estimates. When a satisfactory pose uncertainty estimate is achieved, the machine stop and stare operation may return to dead reckoning for navigation and repeat the absolute localization intermittently.

While described herein in illustrative examples as an autonomous mower, such a configuration is only illustrative, as systems and methods described herein also have application to other autonomous machines including, for example, commercial mowing products, other ground working machines or vehicles (e.g., debris blowers/vacuums, aerators, dethatchers, material spreaders, snow throwers, weeding machines for weed remediation), indoor working vehicles such as vacuums and floor scrubbers/cleaners (e.g., that may encounter obstacles), construction and utility vehicles (e.g., trenchers), observation vehicles, and load transportation (e.g., including people and things, such as people movers and hauling equipment). Furthermore, the autonomous machines described herein may employ various one or more types of navigation, such as random, modified random, or specific path planning, to carry out their intended functionality.

As used herein, the term "slowed" refers to reduced movement of the autonomous machine from a first speed to a second speed lower than the first speed. The first speed may correspond to a nominal operation speed used by the machine to perform tasks in a work region. The second speed may correspond to a speed used to capture an image in lowlight conditions for vision-based localization. In general, the second speed is sufficiently slow to allow capturing one or more images without significant blur such that features may be extracted from the captured image or images.

As used herein, the term "stopped" refers to slowed or reduced movement of the autonomous machine to a speed equal to or almost equal to zero (e.g., less than or equal to 0.1, 0.05, or even 0.01 m/s).

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine 100 is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described.

The techniques of this disclosure may be used with any suitable autonomous machine. FIG. 1 illustrates one example of an autonomous grounds maintenance machine (e.g., an autonomously operating vehicle, such as an autonomous lawn mower 100) of a lawn mowing system (for simplicity of description, the mower 100 is illustrated schematically). The mower 100 may include functionality to navigate autonomously in various light conditions, such as in daylight or at night.

As shown in this view, the mower 100 may include a housing 102 (e.g., frame or chassis with a shroud) that carries and/or encloses various components of the mower as described below. The mower 100 may further include ground support members, such as wheels, rollers, legs, or tracks. In the illustrated embodiment, ground support members shown includes one or more rear wheels 106 and one or more front wheels 108, that support the housing 102 upon a ground (grass) surface 103. As illustrated, the front wheels 108 are used to support a front-end portion 134 of the mower housing 102 and the rear wheels 106 are used to support the rear end portion 136 of the mower housing.

One or both rear wheels 106 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to some existing zero-turn-radius (ZTR) riding mowers. That is to say, the propulsion system may include a separate wheel motor 104 for each of a left and right rear wheel 106 so that speed and direction of each rear wheel may be independently controlled. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the blade 110. While illustrated herein using only a single blade 110 and/or motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion chemistry or lithium iron phosphate chemistry). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single motor are also contemplated.

The mower 100 may further include one or more sensors to provide location data. For instance, some embodiments may include a global positioning system (GPS) receiver 116 (or other position sensor that may provide similar data) that is adapted to estimate a position of the mower 100 within a work region and provide such information to a controller 120 (described below). In other embodiments, one or more of the wheels 106, 108 may include encoders 118 that provide wheel rotation/speed information that may be used to estimate mower position (e.g., based upon an initial start position) within a given work region. The mower 100 may also include a sensor 115 adapted to detect a boundary wire, which could be used in addition to other navigational techniques described herein.

The mower 100 may include one or more front obstacle detection sensors 130 and one or more rear obstacle detection sensors 132, as well as other sensors, such as side obstacle detection sensors (not shown). The obstacle detection sensors 130, 132 may be used to detect an obstacle in the path of the mower 100 when traveling in a forward or reverse direction, respectively. The mower 100 may be capable of mowing while moving in either direction. As illustrated, the sensors 130, 132 may be located at the front-end portion 134 or rear end portion 136 of the mower 100, respectively. In addition to the sensors described, other sensors now known or later developed may also be incorporated into the mower 100.

The sensors 130, 132 may use contact sensing, non-contact sensing, or both types of sensing. For example, both contact and non-contact sensing may be enabled concurrently or only one type of sensing may be used depending on the status of the mower 100 (e.g., within a zone or traveling between zones). One example of contact sensing includes using a contact bumper protruding from the housing 102, or the housing itself, that can detect when the mower 100 has contacted the obstacle. Non-contact sensors may use acoustic or light waves to detect the obstacle, sometimes at a distance from the mower 100 before contact with the obstacle (e.g., using infrared, radio detection and ranging (radar), light detection and ranging (lidar), etc.).

The mower 100 may include one or more vision-based sensors to provide localization data, such as position, orientation, or velocity. The vision-based sensors may include one or more cameras 133 that capture or record images for use with a vision system. The cameras 133 may be described as part of the vision system of the mower 100. Types of images include, for example, training images and/or operational images.

The one or more cameras 133 may be capable of detecting visible light, non-visible light (e.g., infrared light), or both. Any suitable total field of view may be used. In some embodiments, the one or more cameras 133 may establish a total field of view relative to a horizontal plane greater than or equal to 30, 45, 60, 90, 120, 180, 270, or 360 degrees, around the autonomous machine (e.g., mower 100). In some embodiments, one or more cameras 133 may establish a total field of view, for example, relative to a horizontal plane less than or equal to 360, 270, 180, 120, 90, 60, 45, or 30 degrees around the autonomous machine. The field of view may be defined in a horizontal direction, a vertical direction, or both directions. For example, a total horizontal field of view may be less than or equal to 360 degrees, and a total vertical field of view may be 45 degrees. In some embodiments, the total field of view may be described in a three-dimensional (3D) geometry, such as steradians. For example, the total field of view may be less than or equal to 4π steradians. The field of view may capture image data above and below the height of the one or more cameras 133.

In some embodiments, the mower 100 includes four cameras 133. One camera 133 may be positioned in each of one or more of directions including a forward direction, a reverse direction, a first side direction, and a second side direction (e.g., Cardinal directions relative to the mower 100). One or more camera directions may be positioned orthogonal to one or more other cameras 133 or positioned opposite to at least one other camera 133. The cameras 133 may also be offset from any of these directions (e.g., at a 45 degree or another non-right angle).

The mower 100 may include one or more illumination sources 140 that may be activated by the controller 120. The one or more illumination sources 140 may be incorporated in one or more of the cameras 133 or attached to the housing 102. The illumination source 140 may illuminate one or more areas around the mower 100. The illumination source 140 may be configured to project light above a ground level. This may prevent the one or more cameras of the cameras 133 from being blinded by reflections off the ground. Any suitable type of illumination source 140 may be used, such as a light-emitting diode.

In some embodiments, the illumination source 140 may be configured to provide a continuous or a discrete amount of light. For example, the illumination source 140 may "flash" or provide a short-duration burst of light when a lowlight image is to be recorded.

The illumination source 140 may provide light in one or more of the visible, infra-red, or near infra-red spectra. In some embodiments, the illumination source 140 produces only non-visible light, such as infra-red light. The non-visible, or visible, light provided by the illumination source 140 may be detectable by the camera 133.

Various intensities of exposure time and/or illumination may be used, for example, based on the environment. The exposure time may also be balanced with the amount of illumination intensity. In some environments, a low intensity of light or no light may be used, for example, with a long exposure time. In other environments, a medium or high intensity of light may be used with a short or medium exposure time.

The mower 100 may be guided along a path, for example, in a manual manner using a handle. In particular, manual direction of the mower 100 may be used during a training mode to learn a work region or a boundary associated with the work region.

The camera 133 positioned in a forward direction may have a position and orientation that represents a pose of the autonomous machine. In some embodiments, the position and orientation of the cameras may be defined relative to a geometric center of the mower 100 or relative to one of the edges of the mower 100.

As used herein, the term "pose" refers to a position and an orientation. The pose may be a six-degrees of freedom pose (6DOF pose), which may include all position and orientation parameters for a three-dimensional space. Pose data may include a three-dimensional position and a three-dimensional orientation. For example, the position may include at least one position parameter selected from: an x-axis, a y-axis, and a z-axis coordinate (e.g., using a Cartesian coordinate system). Any suitable angular orientation representations may be used. Non-limiting examples of angular orientation representations include a yaw, pitch, and roll representation, a Rodrigues' representation, a quaternions representation, and a direction cosine matrix (DCM) representation may also be used alone or in combination. In one example, the orientation may include at least one orientation parameter selected from a yaw (e.g., vertical z-axis orientation), a pitch (e.g., a transverse y-axis orientation), and a roll (e.g., a longitudinal x-axis orientation).

Sensors of the mower 100 may also be described as either vision-based sensors or non-vision-based sensors. Vision-based sensors may include cameras 133 that are capable of recording images. The images may be processed and used to build a three-dimensional (3D) point cloud or used for optical odometry (e.g., optical encoding). Non-vision-based sensors may include any sensors that are not cameras 133. For example, a wheel encoder that uses optical (e.g., photodiode), magnetic, or capacitive sensing to detect wheel revolutions may be described as a non-vision-based sensor that does not utilize a camera. Wheel encoding data from a wheel encoder may be also described as odometry data.

Optical encoding may be used by taking a series or sequence of images and comparing features in the images to determine or estimate a distance traveled between the images. Optical encoding may be less susceptible to wheel slippage than a wheel encoder for determining distance or speed.

In addition to the sensors described above, other sensors now known or later developed may also be incorporated into the mower 100.

The mower 100 may also include a controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GPS receiver 116 and/or encoders 118 and generate speed and steering angle commands to the drive wheel motor(s) 104 to cause the drive wheels 106 to rotate (at the same or different speeds and in the same or different directions). In other words, the controller 120 may control the steering angle and speed of the mower 100, as well as the speed and operation of the cutting blade.

The mower 100 may include one or more illumination sources 140 that may be activated by the controller 120. The one or more illumination sources 140 may be incorporated in one or more of the cameras 133 or attached to the housing 102. The illumination source 140 may illuminate one or more areas around the mower 100. The illumination source 140 may be configured to project light above a ground level. This may prevent the one or more cameras of the cameras 133 from being blinded by reflections off the ground. Any suitable type of illumination source 140 may be used, such as a light-emitting diode.

Each system may also be described as having its own controller 120. For example, the vision system may be described as including one controller 120 and the navigation system may be described as having another controller 120. As such, the mower 100 may be described as having multiple controllers 120. In general, as used herein, the term "controller" may be used to describe components of a "system" that provide commands to control various other components of the system.

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124, and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed with Internet-connected cloud computing or other distributed computing systems operably connected to the processor 122.

In FIG. 1, schematic connections are generally shown between the controller 120 and the battery 114, wheel motor(s) 104, blade motor 112, optional boundary wire sensor 115, wireless radio 117, and GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, 133 are not shown, these sensors and other components of the mower 100 may be connected in a similar manner. The wireless radio 117 may communicate over a cellular or other wide area network (e.g., even over the internet), a local area network (e.g., IEEE 802.11 "Wi-Fi" radio), or a peer-to-peer (P2P) (e.g., BLUETOOTH') network with a separate user interface device 119 (e.g., mobile device, such as a smartphone, tablet, desktop, or wearable computer). In turn, the user interface device 119 may communicate with other devices over similar networks and, for example, may be used to connect the mower 100 to the internet. In addition, controller 120 of the mower 100 may be in operative communication (e.g., via a wireless radio 117) with a separate device, such as a remote computer or other user interface device 119.

The user interface device 119 may or may not be couplable to the mower 100. In some embodiments, the user interface device 119 may be used to provide user input or commands from the user to the mower 100. In some embodiments, the user interface device 119 may be used to provide an indication to the user, such as a visual presentation on a graphical user interface (e.g., screen or touchscreen).

In some embodiments, various functionality of the controller or controllers 120 described herein may be offloaded from the mower 100. For example, recorded images may be transmitted to a remote server (e.g., in the cloud) using the wireless radio 117 and processed or stored. The images stored, or other data derived from processing, may be received using the wireless radio 117 and be stored on, or further processed by, the mower 100.

The mower 100 may utilize the exemplary vision and navigation systems to permit autonomous operation of the mower within a given work region(s). More information regarding exemplary operation and navigation of the mower 100 may be found, for example, in U.S. patent application Ser. No. 16/534,515, filed Aug. 7, 2019, which is incorporated herein by reference.

In general, the controller 120 and various components or systems of the mower 100 may be used to carry out various functionality described herein. Components of the vision and navigation systems (e.g., the cameras 133) may, in some embodiments, be utilized in lowlight conditions. In addition to addressing navigation of dimly lit areas, the vision and navigations systems may be used to conserve power when mowing in lowlight conditions (e.g., night). Some examples of systems of the mower 100 are shown in FIG. 2.

Figure 2:
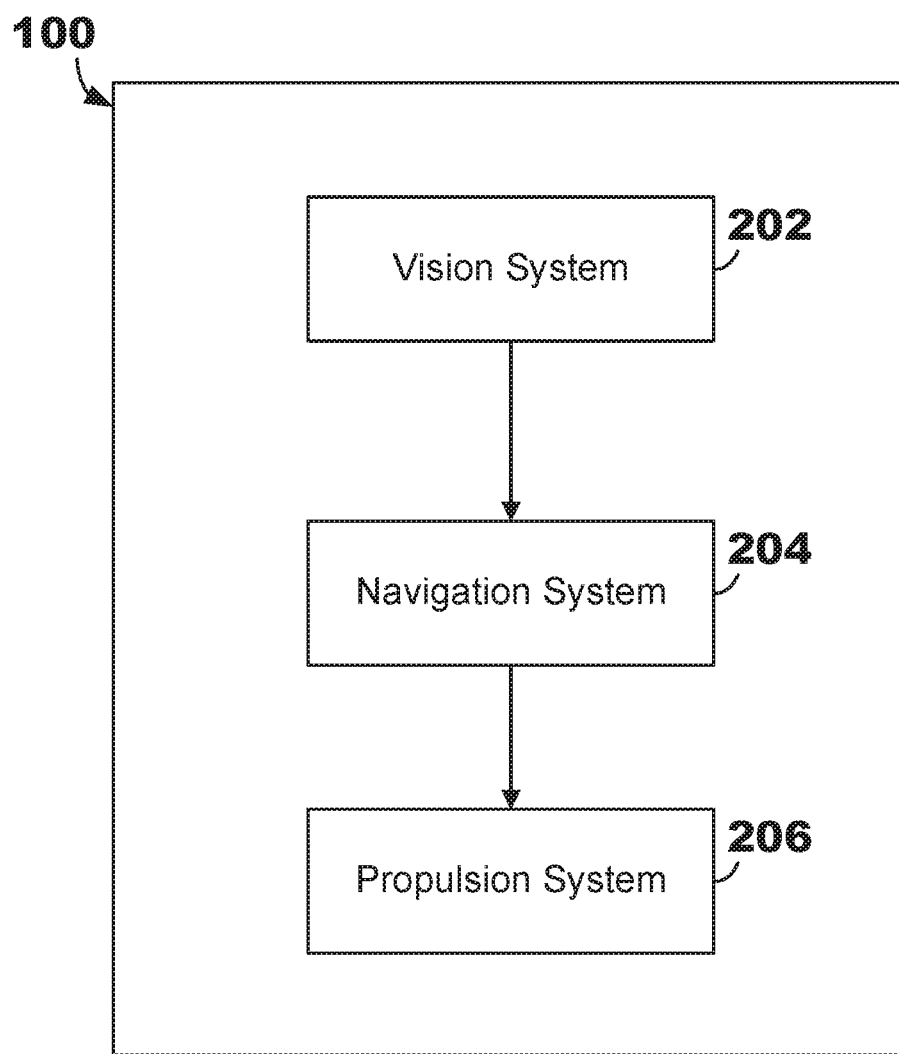
FIG. 2 is a schematic diagram of one example of various systems for use with the machine of FIG. 1 in accordance with the present disclosure.

FIG. 2 shows an overview of various systems of an autonomous machine (e.g., the mower 100 of FIG. 1) including a vision system 202, a navigation system 204, and a propulsion system 206. Although all systems 202, 204, 206 are shown as entirely part of the mower 100, in some embodiments, some or all of each system may also be located off the mower 100. The vision system 202 may be operably coupled to the navigation system 204, and the navigation system 204 may be operably coupled to the propulsion system 206. Any suitable navigation technique may be used with the mower 100. In some embodiments, navigation techniques may be used as described in U.S. patent application Ser. No. 16/534,515, filed Aug. 7, 2019, and U.S. Provisional Application No. 62/831,347, filed Apr. 9, 2019, which are incorporated herein by reference.

Sensors of the navigation system 204 may be used to record non-vision-based data during a training mode while the vision system 202 records images, such as training images. Although the mower 100 may be directed manually by a user, in some embodiments, the navigation system 204 may autonomously direct the machine during the training mode. The vision system 202 may include one or more cameras to record, or capture, images. In some embodiments, a controller of the vision system 202 may provide position and/or orientation data to the navigation system 204 based on the recorded images, which may be used to facilitate navigation of the mower 100. For example, the vision system 202 may provide an estimated position and/or orientation of the mower 100 to the navigation system 204 based on vision-based sensor data.

In some embodiments, the navigation system 204 may primarily use a position and/or orientation based on non-vision-based sensor data for navigation. For example, non-vision-based sensor data may be based on an output from an inertial measurement unit or wheel encoder. During a training mode or an offline mode, for example, a controller of the navigation system 204 may determine a boundary using non-vision-based sensor data, and the vision-based data, for subsequent navigation of the autonomous machine in the work region. During an online mode, for example, a controller of the navigation system 204 may determine a pose based on vision-based pose data, non-vision-based pose data, or both. In some embodiments, a pose may be determined based on non-vision-based sensor data and update the pose based on the vision-based pose data, which may be described as vision-based localization. The navigation system 204 may compare data from various sensors to correct for errors and update the position, which may be described as sensor fusion. For example, the vision-based position and/or orientation may be compared to the non-vision-based position and/or orientation. In some embodiments, sensor data other than vision-based sensor data may be used to correct for errors and update the position, such as GPS data.

The navigation system 204 may extract feature data from images captured by the vision system 202. Feature data may be extracted from training images to provide training feature data. Using training feature data, the navigation system 204 may generate a three-dimensional point cloud (3DPC) and associated data, which may include a plurality of 6DOF poses of the autonomous machine, to represent the work region. The 3DPC and poses may be registered in a navigation map. Optionally, non-vision-based data, such as GPS data, IMU data, and odometry data may also be registered to a real-world coordinate system, such as a coordinate system of an Earth-referenced map. Feature data may be extracted from operational images and compared with the training feature data, which may be described as feature matching. During operation, the comparison of operational feature data to training feature data may be used to identify a position and/or orientation of the autonomous machine to facilitate navigation.

Figure 9:
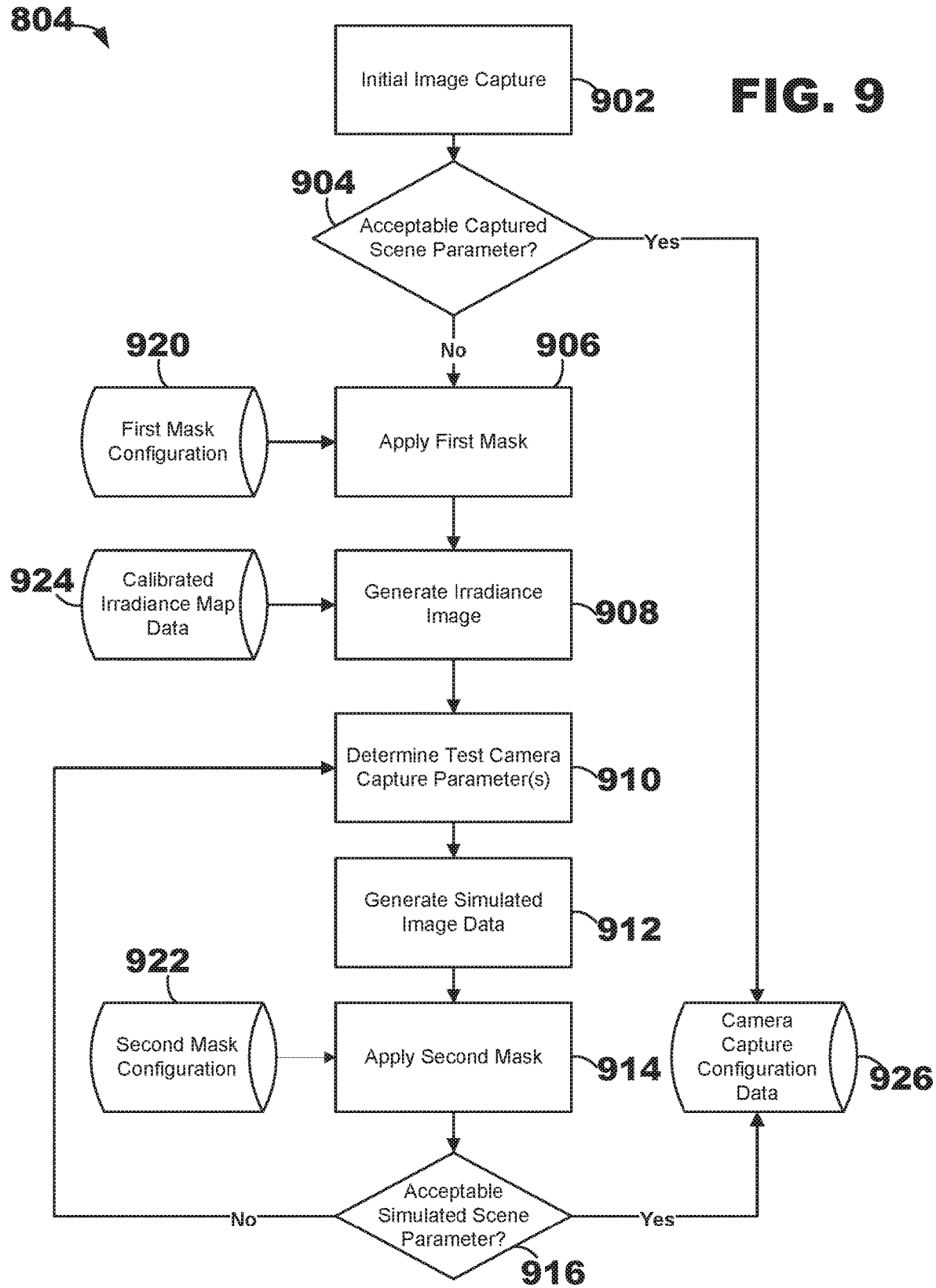
FIG. 9 is a flow diagram of one example of a method of automatic camera capture configuration for use with the machine of FIG. 1 in accordance with the present disclosure.

In some aspects, operational images may be analyzed to determine whether the images are "well exposed." In one example, operational images may be analyzed for acceptable scene capture parameters (see block 904 of FIG. 9).

As used herein, the term "feature" refers to two-dimensional (2D) data that results from identifying one or more points, in particular key points or points of interest, in a two-dimensional image. Features may be identified in and extracted from an image using a feature detector algorithm. Any suitable feature detector algorithm available to one having ordinary skill in the art may be used depending on the particular autonomous machine and application. In some embodiments, each unique feature refers to only one point, or point of interest, in an image or 3DPC. The feature may be stored as feature data containing coordinates defined relative to the image frame. In some embodiments, feature data may also include a descriptor applied to, associated with, or corresponding to the feature. The term "feature data" refers to a data structure that represents features and may include a two-dimensional position and a multi-dimensional descriptor (e.g., referring to various identifying properties of the feature).

Key points used to identify features may be extracted from various objects in an image. In some embodiments, the objects may be permanent, temporary, or both. In some embodiments, the objects may be natural, artificial, or both. One example of a permanent feature is a corner of a house. One example of a natural feature is an edge of a tree trunk. Some examples of temporary and artificial features include a stake in the ground and a target on a tree. The artificial feature may be temporarily placed and used to increase feature density within a work region (e.g., to improve a low-quality portion of a 3DPC). The artificial feature may be powered and, for example, may include a light emitter for visible or non-visible light detectable by a camera. The artificial feature may be unpowered and, for example, may include a visible or non-visible pattern detectable by a camera. Some artificial features may be permanently placed. As used herein, the term "non-visible" refers to emitting or reflecting wavelengths of light that are not visible to the human eye, but which may emit or reflect wavelengths visible by a camera, such as an infrared camera on the autonomous machine.

As used herein, the term "descriptor" refers to two-dimensional data that results from a descriptor algorithm. The descriptor describes the feature in the context of the image. In some embodiments, a descriptor may describe pixel values, image gradients, scale-space information, or other data in the image near or around the feature. For example, the descriptor may include an orientation vector for the feature or may include a patch of image. Any suitable descriptor algorithm for providing context for a feature in an image that is available to one having ordinary skill in the art may be used depending on the particular autonomous machine or application. A descriptor may be stored as part of feature data.

Any suitable technique may be used to extract features from images, which may include or utilize algorithms, such as a Scale Invariant Feature Transform (SIFT), Speeded Up Robust Features (SURF), Oriented FAST and Rotated Brief (ORB), KAZE, Accelerated-KAZE (AKAZE), linear feature tracking, camera merging, loop closure, incremental structure from motion, or other suitable algorithms. Such algorithms may, for example, provide one or more features and related descriptors.

Any suitable technique may be used for feature matching, which may include or utilize algorithms, such as Brute-Force, Approximate Nearest Neighbor (ANN), and Fast Library for Approximate Nearest Neighbor (FLANN). The Brute-Force algorithm may match features by selecting one feature and checking all other features for a match.

As used herein, the term "three-dimensional point cloud," "3D point cloud," or "3DPC" is a data structure that represents or contains three-dimensional geometric points which correspond to features extracted from images. The 3DPC may be associated with various properties, such as poses. In some embodiments, the geometric points and poses may or may not be defined in a coordinate system based on an arbitrary frame of reference. In some embodiments, the 3DPC may or may not be associated with a scale, orientation, or both that is tied to the real-world, for example, until a map registration process has been performed. The 3DPC may be generated based on feature matching data. A graph, or visual map, may be generated based on the 3DPC to provide a human-viewable representation of the 3DPC.

Any suitable technique may be used to generate the 3DPC, which may include or utilize algorithms, such as Structure from Motion (SfM) or Simultaneous Localization and Mapping (SLAM), either of which may be used with various embodiments of the present disclosure, for example, depending on the particular autonomous machine and application.

A controller, which may be separate from or part of either or both the vision system 202 and the navigation system 204, may command the propulsion system 206 based on an updated pose. For example, a corrected or updated position or orientation may be used to provide propulsion commands to a propulsion system 206. The propulsion system 206 (e.g., propulsion hardware) may be defined to include, for example, motors 112, 104 and wheels 106, 108 (FIG. 1) or any related drivers (e.g., motor controllers or microchips).

In some embodiments, the autonomous mower may learn and subsequently recognize a boundary of the work region using an onboard machine vision system and, optionally, other non-vision-based sensors. The vision system may utilize one or more cameras that together form part of a navigation system as described more fully in U.S. patent application Ser. No. 16/534,515, filed Aug. 7, 2019, which is incorporated herein by reference.

Techniques of the present disclosure may utilize existing cameras, which may be used in non-lowlight conditions (e.g., daylight conditions during the daytime) and may conserve battery power to facilitate efficient coverage of a work region in lowlight conditions.

Figure 3:
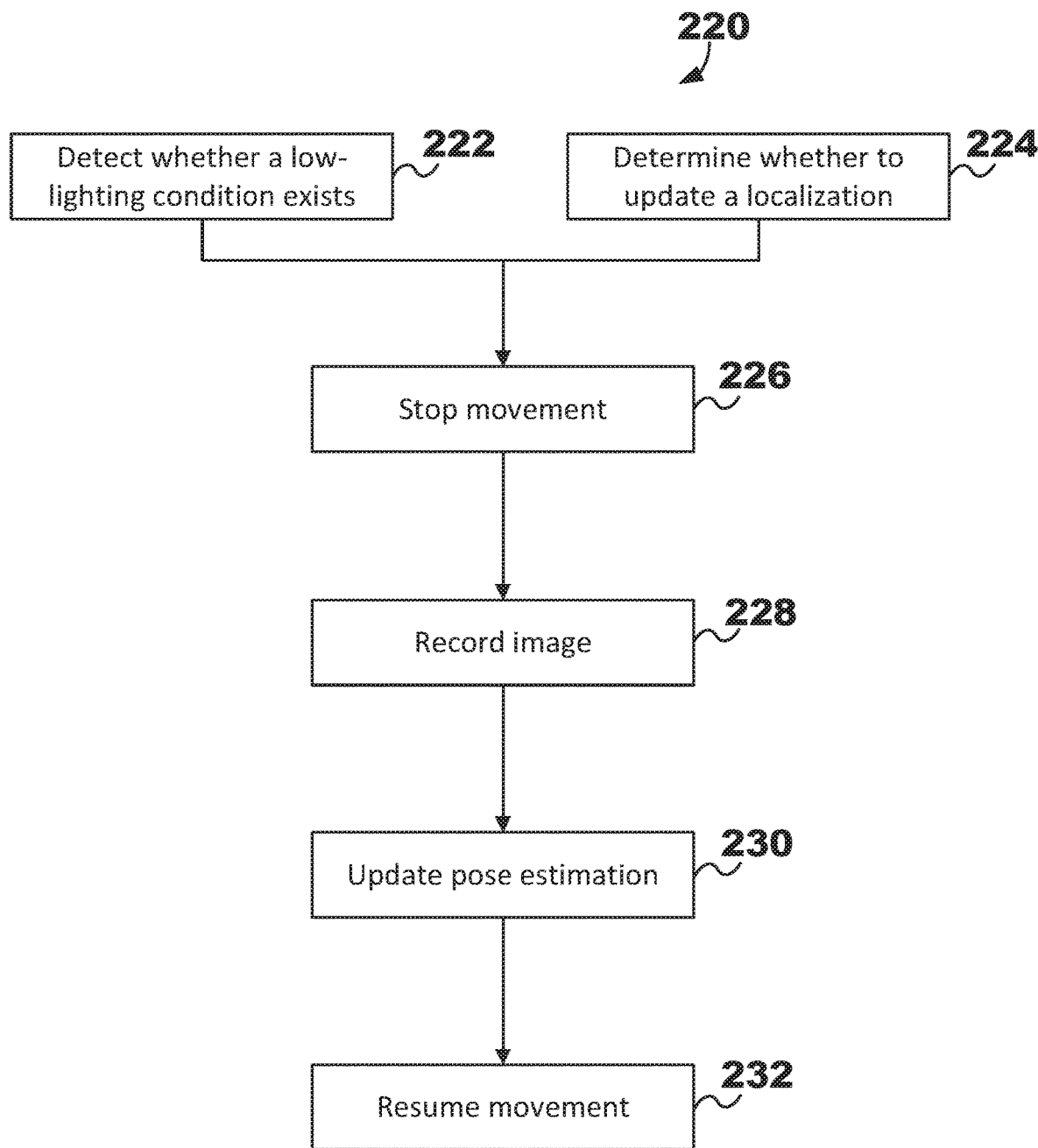
FIG. 3 is a flow diagram of one example of a navigation method for use with the machine of FIG. 1 in accordance with the present disclosure.

In FIG. 3, a schematic representation of one example of an autonomous machine navigation process 220 is shown.

At step 222, whether a lowlight condition exists may be detected. For example, the lowlight condition may be detected by the navigation system 204. The lowlight condition may be detected based on data received by navigation system 204 from vision system 202. In some aspects, the process 220 may also include capturing image data while the machine is moving in lowlight conditions in the work region.

At step 224, whether to update a localization of the autonomous machine may be determined. For example, whether to update the localization may be determined by the navigation system 204. In some embodiments, a localization may include a vision-based pose estimate, for example, by acquiring a new estimate of the machine's position and orientation from the vision system.

At step 226, a command may be provided by a controller for the propulsion system 206 to slow or stop movement of the autonomous vehicle by providing the command to the propulsion system 206. A command to slow or stop movement may be provided in response to determining to update the localization in step 224 and detecting the lowlight condition at step 222.

At step 228, a command may be provided by a controller for the vision system 202 to record an image (e.g., long exposure or HDR images). The recorded image may be an image of the work region of the autonomous machine (e.g., the mower 100). The image may be recorded in a lowlight condition or non-lowlight conditions by a camera (e.g., the camera 133). In some aspects, the recorded image may be captured by one or more cameras using at least one camera capture configuration parameter calculated by a camera capture configuration operation in block 706 (see FIG. 7).

At step 230, a pose estimation may be updated based on the recorded image. Any suitable technique may be used to estimate a pose, such as techniques described in U.S. patent application Ser. No. 16/534,515, filed Aug. 7, 2019, which is incorporated by reference.

At step 232, movement may be resumed. In some embodiments, if there is no lowlight condition and updating the localization is determined, step 226 and 232 may be skipped.

In some embodiments, the mower 100 may operate with a duty cycle that is less than the duty cycle of the mower during daylight navigation.

Figure 4:
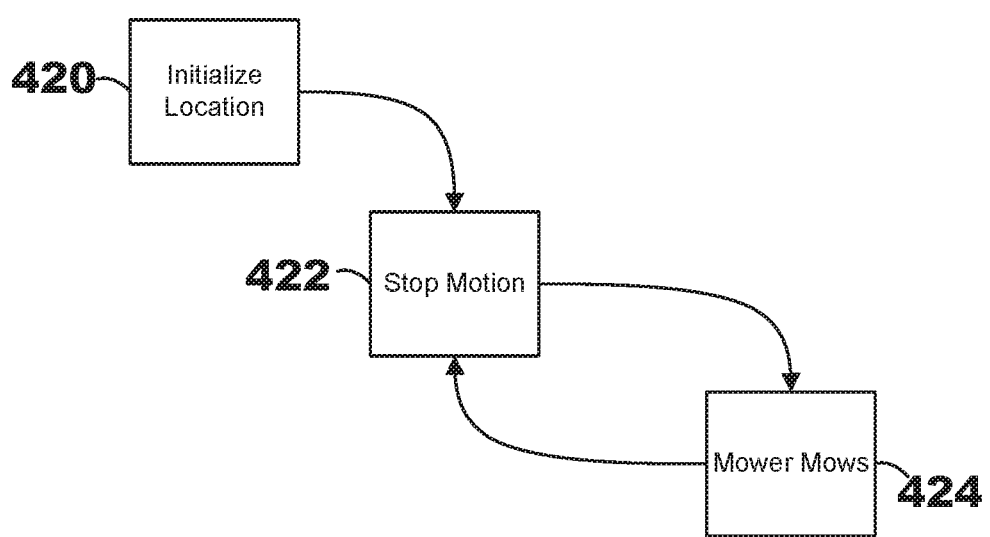
FIG. 4 is a schematic diagram of one example of implementing the navigation method of FIG. 3 in accordance with the present disclosure.

In FIG. 4, a schematic representation of various functionality of slow or stop and stare operation of the autonomous machine (e.g., mower 100) in accordance with one embodiment is shown. Functionality of the autonomous machine may include initializing location, slowing or stopping motion, and moving or operating (e.g., mowing).

The initialize location functionality in block 420 may be used, for example, when the autonomous machine is backing out of a docking station, or base station. The autonomous machine may use onboard illumination (e.g., illumination source 140) to illuminate docking targets for tracking, which may be positioned on or near the docking station. The onboard illumination may be used for a limited or predetermined distance. The docking targets may be described as artificial features, which may or may not be processed in the same manner as other features, such as natural features, in the work region. In some embodiments, the artificial features may be processed using different techniques (e.g., without using a 3DPC).

The slow or stop motion or movement functionality 422 may be used to selectively slow or stop movement of the autonomous machine. Movement may be slowed or stopped, for example, when an uncertainty parameter, reaches a threshold value and a localization update is needed or requested by the navigation system. As used herein, the term "uncertainty parameter" refers to a threshold measure of estimated uncertainty of error of whole or partial estimated state, e.g., an estimated uncertainty of error in the estimated position. The uncertainty parameter may be compared to a threshold. In some embodiments, the uncertainty parameter may be based on a pose filter covariance that may become large and exceed a threshold. The threshold may be determined, for example, based on estimated position error from a pose filter covariance. In some embodiments, estimated position error may be determined based on an expanded Kalman filter (EKF) parameter, a pose filter parameter, or a parameter from a covariance matrix. When a localization is to be updated, the navigation system (e.g., navigation system 204) may communicate with the vision system (e.g., vision system 202) to capture or record one or more long exposure images, for example, using a longer exposure time to record each image compared to an exposure time for nominal, daylight, or non-lowlight conditions.

The vision system may evaluate the image quality of each recorded image. If the quality of a recorded image is below a threshold, the vision system may determine that the exposure time needs to be adjusted. If adjustment is needed the vision system may adjust the exposure time and record another image at the adjusted exposure time. If the quality of a recorded image meets or exceeds the quality threshold, the image may be processed to determine a pose of the autonomous machine. In some embodiments, the pose may be reported or provided to a pose filter of the autonomous machine.

The mowing or movement functionality in block 424 may be used to move the autonomous machine. The autonomous machine may begin or resume movement, for example, after being slowed or stopped to record a lowlight image. In some embodiments, the autonomous machine may cut or mow while moving. The autonomous machine may move for a limited time or distance, for example, until a localization update is needed or requested.

During movement, the pose filter covariance may grow. The pose filter covariance may approach or exceed a threshold as it grows, which may be used to determine whether to record a lowlight image.

Figure 5:
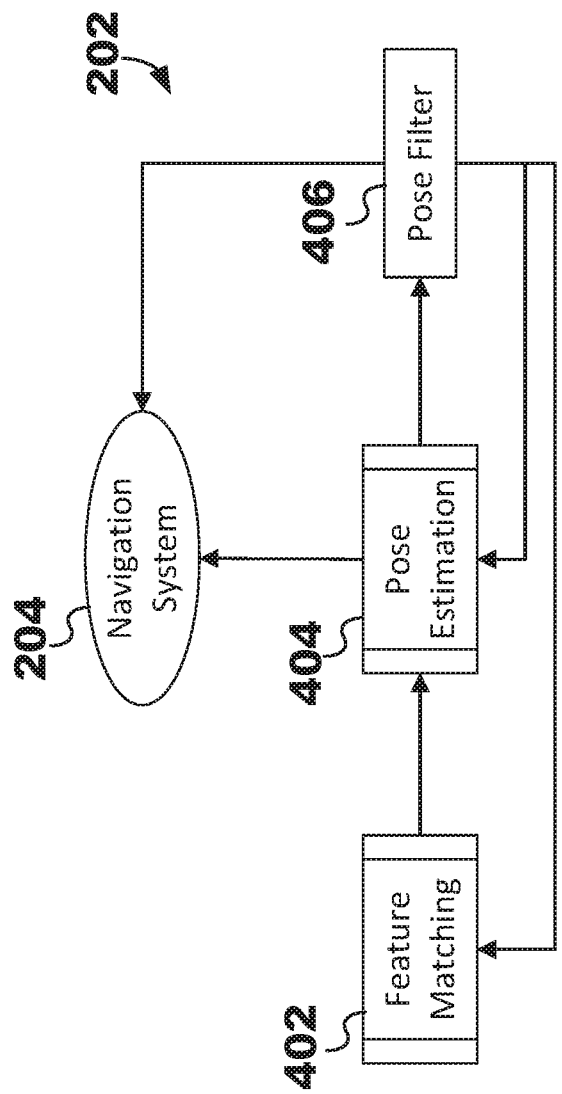
FIG. 5 is a flow diagram of one example of the functional relationship between the vision system and the controller of FIG. 2 in accordance with the present disclosure.

In FIG. 5, shows one example of a relationship between the vision system 202 and a navigation system 204 during autonomous machine navigation. The pose estimation module 404 may provide an estimated pose, which may be described as a vision-based pose. Vision-based pose data from the pose estimation module 404 may be provided to the navigation system 204, back to a pose filter 406, back to a feature matching module 402, or any combination thereof. In some embodiments, the pose data may also be communicated directly to any controller, such as the controller of the navigation system 204. In some embodiments, a machine vision module may be used alternatively or in addition to the feature matching module 402, which may, for example, utilize a neural network or other suitable machine vision technique to facilitate pose estimation. The navigation system 204 may also provide commands or information to the vision system 202 to record images in lowlight conditions, for example, using longer exposure and/or illumination.

The pose filter 406 may use pose data to identify which poses are likely and provide filtered pose data. The filtered pose data from the pose filter 406 may be provided back to the feature matching module 402 to identify, for example, certain scenes among the possible scenes based on the filtered pose data for feature matching with features in the captured images, which may facilitate faster overall feature matching. The filtered pose data from the pose filter 406 may be provided to the pose estimation module 404 to identify, for example, certain poses among the possible poses based on the filtered pose data, which may facilitate faster pose estimation.

In some embodiments, the pose filter 406 may use prior pose estimates information from other sensors, such as an IMU, wheel encoder, GPS, or optical encoder (e.g., sensors 132 of FIG. 1) to filter poses. The navigation system 204 of FIG. 2 may use an independent pose filter. The resulting output, or pose data, from the different pose filters may be compared for correction of, or as a redundancy check on, either output. In some aspects, the pose filter 406 may select particular scenes in the navigation map (e.g., less than all the scenes in the navigation map) for feature matching with the features extracted from the lowlight image. Using the pose filter 406 may facilitate faster vision-based pose estimation, or localization.

Figure 6:
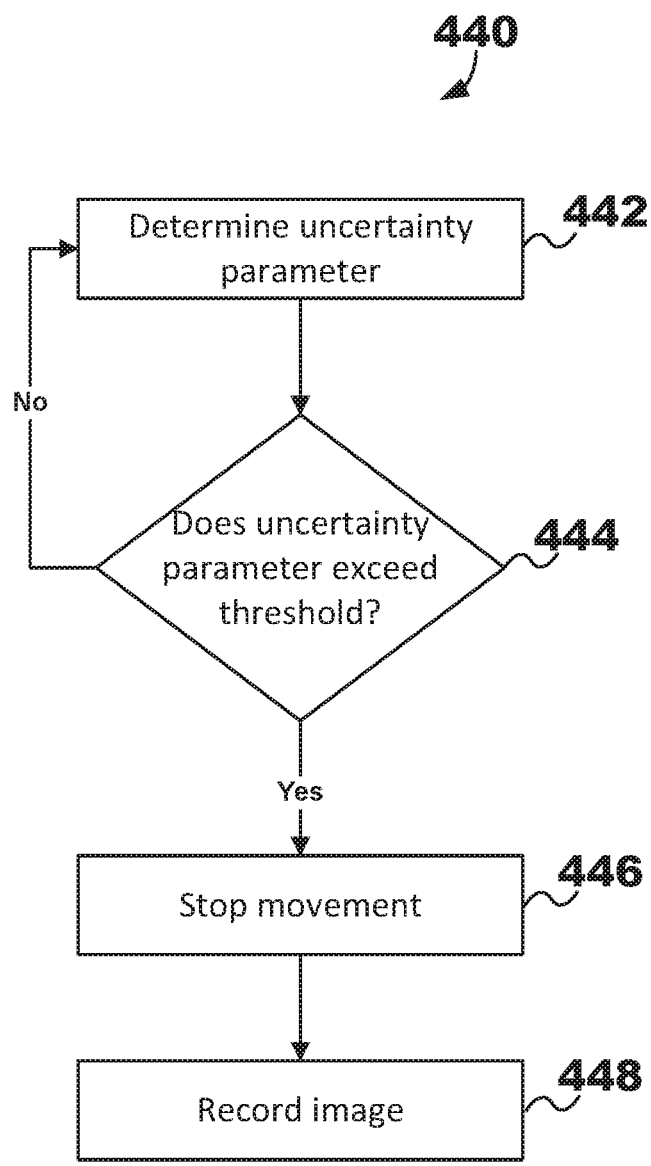
FIG. 6 is a flow diagram of one example of a method of navigation for use with the machine of FIG. 1 in accordance with the present disclosure.

In FIG. 6, a schematic representation of an autonomous machine navigation process 440 for the machine of FIG. 1 in accordance with one embodiment of the present disclosure is shown.

At step 442, an uncertainty parameter corresponding to a current pose and filtered pose data may be determined. The uncertainty parameter may be determined by a controller (e.g., controller of navigation system 204) or feature matching module 402. One non-limiting example of an uncertainty parameter is a covariance determined using the pose filter. At step 444, whether the uncertainty parameter exceeds a threshold may be determined. If the uncertainty parameter does not exceed the threshold the process may return to step 442. If the uncertainty parameter does exceed the threshold the process 440 may proceed to step 446. At step 446, movement of the autonomous machine may be slowed or stopped in response to the uncertainty parameter exceeding the threshold. Slowing or stopping the autonomous machine may include providing a command to the propulsion system (e.g., propulsion system 206). In some embodiments, the machine may be slowed or stopped at or near a natural waypoint. For example, the machine may slow or stop navigation at the next boundary of a containment zone or work region, where the machine would normally slow or stop and turn in non-lowlight conditions. Using the natural slows or stops during navigation for taking long-exposure images may facilitate faster coverage of the work region in lowlight conditions. At step 448, an image of at least a portion of a work region while the autonomous machine is slowed or stopped may be recorded.

Figure 7:
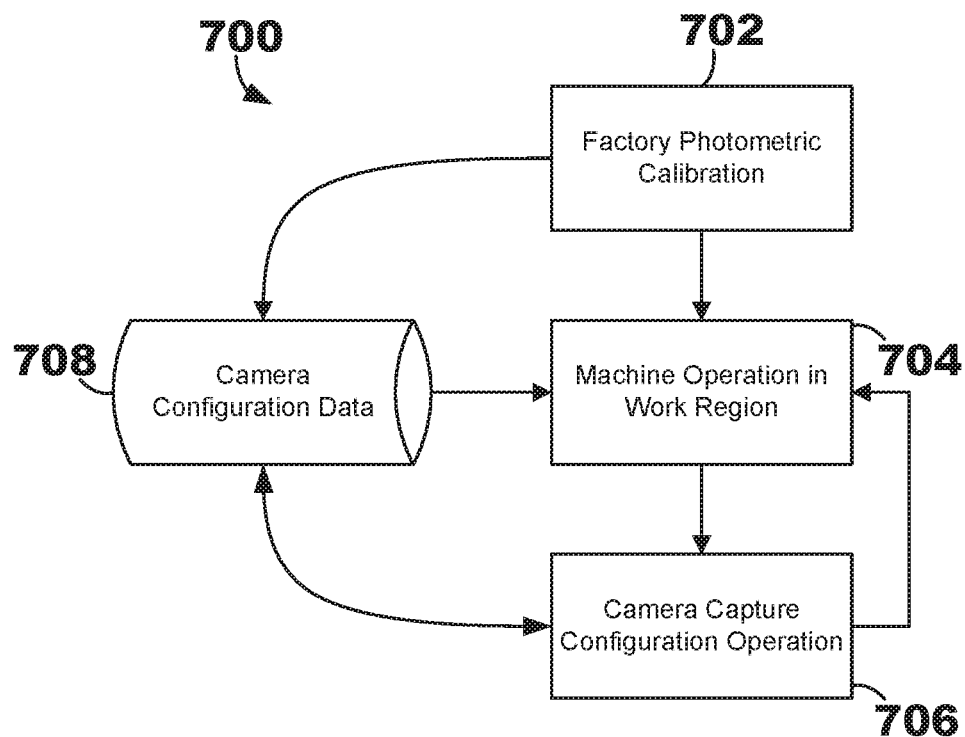
FIG. 7 is a flow diagram of one example of a method of navigation including camera capture configuration for use with the machine of FIG. 1 in accordance with the present disclosure.

FIG. 7 is a flow diagram showing one example of a method of navigating a lowlight conditions usable with the mower 100 of FIG. 1. As illustrated, the method 700 includes factory photometric calibration of one or more cameras in block 702. The factory photometric calibration may be described as camera calibration data, which may be stored as camera configuration data in block 708, for example, in memory of the mower 100 (FIG. 1). In general, camera configuration data may include the camera calibration data, camera capture configuration data, or both.

The camera calibration data provided by the factory photometric calibration in block 702 may include calibrated irradiance map data. The calibrated irradiance map data may be used to convert a pixel intensity captured by one or more cameras into irradiance.

Any suitable data structure may be used to map a pixel intensity to irradiance. In some aspects, a look up table (LUT) is used to convert a pixel intensity to irradiance. Pixel intensities may be used to describe a grayscale or color space, such as RGB. In some aspects, a pixel intensity ranges from 0 to 255. Irradiance may be used to describe the radiant flux (power) received by a surface per unit area. In some aspects, irradiance is measured in watts per square meter (W/m²).

The camera calibration data provided by the factory photometric calibration in block 702 may also include one or more camera capture parameters usable to capture image data. The camera capture parameters provided concurrently with the factory photometric calibration in block 702 and may also be described as initial, nominal, or factory default camera capture parameters. In some aspects, the one or more camera capture parameters may include one or more of the following: exposure time, gain, and active lighting intensity. Active lighting intensity may be provided, for example, by the one or more illumination sources 140 (FIG. 1).

The method 700 may also include machine operation in a work region in block 704. During machine operation in the work region, the mower 100 may move throughout the work region to perform various operations, such as mowing turf. In lowlight conditions, the mower 100 may slow or stop to perform vision-based localization as needed. In some aspects, the mower 100 may minimize the amount of time slowed or stopped during machine operation, for example, by configuring camera capture parameters during operation.

A camera capture configuration operation may be included in block 706 of the method 700. The camera capture configuration operation in block 706 may be used to update one or more camera capture parameters, which may be described as camera capture configuration data, which may be stored in camera configuration data in block 708. The one or more camera capture parameters are usable for capturing images in lowlight conditions. The camera configuration data stored in block 708 may also be used as an initial estimate for a subsequent camera capture configuration data operation in block 706. The camera capture configuration operation in block 706 may be used during machine operation in the work region. In some aspects, the camera capture configuration operation may capture image data while the mower 100 is in movement or is moving. In some aspects, the camera capture configuration operation may also capture image data while the mower 100 is slowed or stopped.

Once the camera capture configuration operation in block 706 is completed, the method 700 may return to machine operation in the work region in block 704. Although one operation may be completed before starting another operation, in other embodiments (see FIG. 8), the machine operation in block 704 and the camera capture configuration operation in block 706 may also be executed concurrently or otherwise in parallel.

Figure 8:
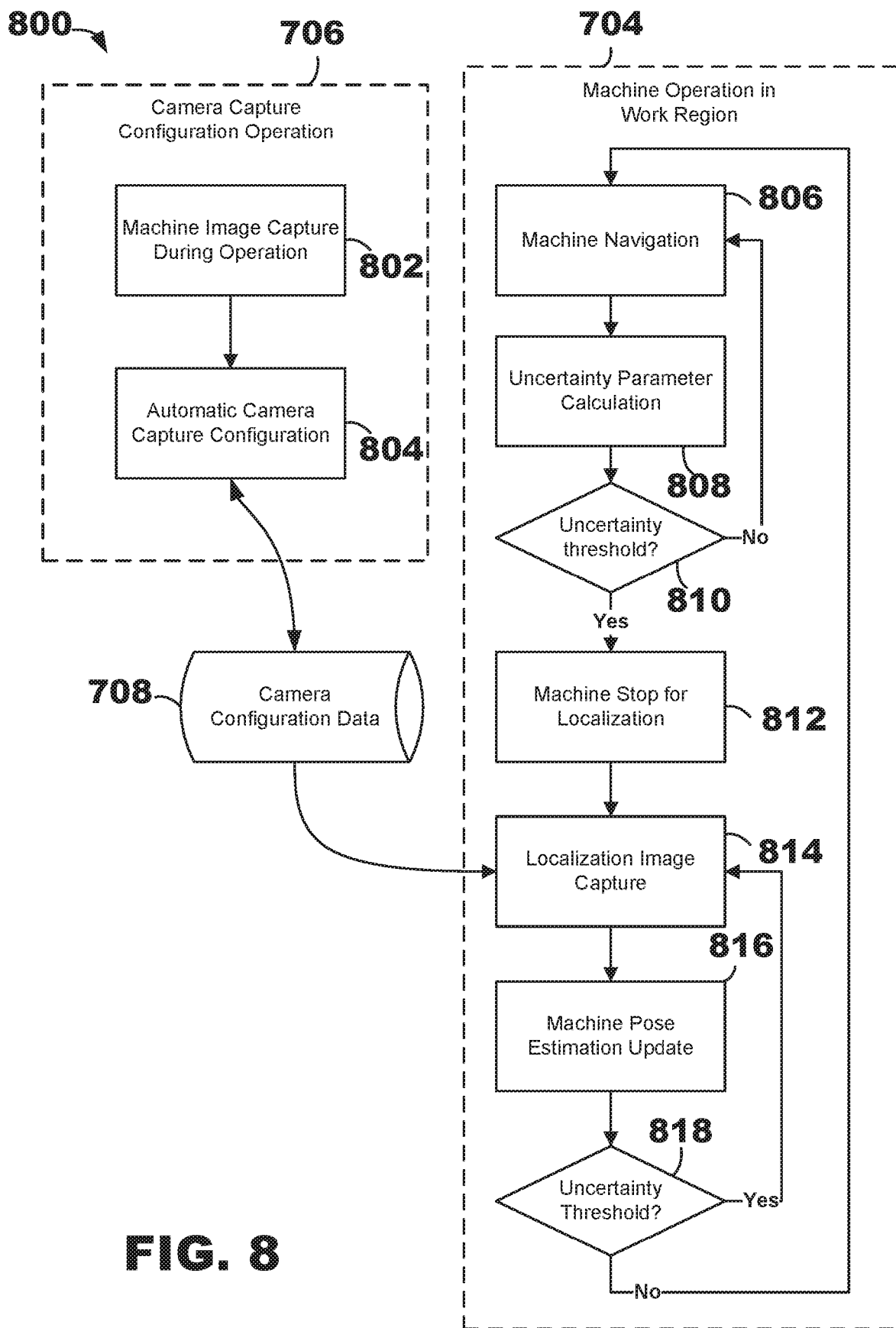
FIG. 8 is a flow diagram of another example of a method of navigation including camera capture configuration for use with the machine of FIG. 1 in accordance with the present disclosure.

FIG. 8 is a flow diagram showing one example of a method of machine operation in lowlight conditions usable with the mower 100 of FIG. 1. As illustrated, a method 800 of machine operation may include one or more processes for the camera capture configuration operation in block 706 and one or more processes for the machine operation in the work region in block 704.

The camera capture configuration operation may include machine image capture during operation of the machine in block 802. In particular, the mower 100 (FIG. 1) may be moving, or otherwise traversing, the work region while capturing an image for camera capture configuration. The camera capture configuration operation may also include automatic camera capture configuration in block 804. The automatic camera capture configuration may also be described as automatic exposure control (AEC) in some cases. In general, the automatic camera capture configuration in block 804 may provide at least one camera capture parameter for capturing images, which may be stored as camera capture configuration data in camera configuration data in block 708, particularly for localization. At least one previously determined camera capture parameter may also be used to capture an initial image in the automatic camera capture configuration.

The machine operation of block 704 may include machine navigation in block 806. The mower 100 may use non-vision-based and vision-based navigation techniques, for example, in combination to navigate around the work region. In one aspect, the mower 100 may continuously use dead reckoning to navigate in the work region, which may be augmented with intermittent vision-based localization, for example, to correct the position of the mower from time-to-time.

Machine operation may also include an uncertainty parameter calculation in block 808. The uncertainty parameter calculation may determine an uncertainty parameter and compare the uncertainty parameter to a threshold. In some aspects, the uncertainty parameter may be determined based on a pose filter covariance that may become large and may exceed a threshold. The threshold may be determined, for example, based on estimated position error from a pose filter covariance.

The uncertainty parameter may be compared to an uncertainty threshold in block 810. In some aspects, machine operation may return to machine navigation in block 806 in response to the uncertainty parameter not exceeding the uncertainty threshold. In some aspects, machine operation may take other actions in response to the uncertainty parameter exceeding the uncertainty threshold.

In some aspects, the uncertainty threshold is determined based on a distance from a boundary of the work region. In particular, the uncertainty threshold may be decreased, or lower, (e.g., tolerate less uncertainty) the closer the mower 100 is to a boundary of the work region compared to when the mower is further from a boundary of the work region.

Machine operation may include slowing or stopping the machine for localization in block 812. In some aspects, the mower 100 may slow or stop and capture an image to perform vision-based localization, which may include feature extraction, feature matching, and pose estimation.

An image for localization may be captured in block 814. One or more cameras used to capture the image for localization may be the same cameras used to perform camera capture configuration. The one or more cameras may be configured using camera configuration data stored in camera configuration data in block 708. In general, the image capture for localization may be on the order of seconds or tens of seconds in lowlight conditions.

An estimated update for the machine pose may be determined in block 816. The machine pose estimation may be updated based on localizing from the image capture.

The uncertainty parameter may be checked in block 818. The uncertainty parameter, for example, corresponding to the current pose estimation and filtered pose data may be determined. In response to the uncertainty parameter not exceeding the uncertainty threshold, machine operation may return to machine navigation in block 806. In response to the uncertainty parameter exceeding the uncertainty threshold, machine operation may loop back to localization image capture in block 814. In some aspects, an image may be captured with a different camera or multiple cameras than used in the previous localization image capture.

FIG. 9 is a flow diagram that shows one example of an automatic camera capture configuration that may be used during the camera capture configuration operation. As illustrated, the automatic camera capture configuration in the method 804 may include capture of an initial image (or captured image) to generate initial image data in block 902 using one or more initial camera capture parameters. As described herein, the mower 100 (FIG. 1) may be moving while the image is captured for camera capture configuration.

A determination whether a captured scene parameter is acceptable may be determined in block 904. An acceptable captured scene parameter may also be described as being "well exposed." The captured scene parameter may be determined based on the initial image data of the initial image. Any suitable captured scene parameter may be used to evaluate the initial image. In some aspects, the captured scene parameter may include or correspond to a mean of pixel intensities in the initial image data. The captured scene parameter may be compared to a captured scene parameter threshold, such as a mean (or average) pixel intensity threshold of other "metric of good exposure." In one example, the captured scene parameter may be acceptable when it exceeds the captured scene parameter threshold. In another example, the captured scene parameter may be acceptable when it falls within at least two captured scene parameter thresholds that define at least one acceptable range.

In response to determining that the captured scene parameter is acceptable, the method 804 may provide an update to at least one camera capture parameter of the camera capture configuration data in block 926. The at least one updated camera capture parameter may be used to capture a subsequent image for camera capture configuration or localization.

In some aspects, the parameters determine for and/or used by the one or more cameras may be balanced or prioritized according to any suitable heuristic. In one example, the one or more camera capture parameters or test camera capture parameters may provide at least a calculated exposure time. An exposure time threshold may be selected. An exposure time threshold may be selected based on a maximum amount of time allowable for a camera exposure (e.g., 12 seconds). The exposure time determined by the method 804 may be compared to the exposure time threshold.

In response to the calculated exposure time of the at least one camera capture parameter exceeding the exposure time threshold, a reduced exposure time may be calculated for use by the one or more cameras. A gain may be increased or otherwise selected for use by the one or more cameras based on the amount of reduction in the exposure time (from the calculated exposure time to the reduced exposure time). The balancing of the exposure time and the gain may provide an effective exposure time equivalent, or almost equivalent, to the exposure time calculated by the method 804.

A first mask may be applied to the initial image to provide a masked initial image and to generate masked initial image data in block 906. The method 804 may apply the first mask in response to determining that the captured scene parameter is not acceptable. The first mask may be applied according to a first mask configuration in block 920, which may be stored in memory of the mower 100.

Any suitable type of mask may be used for the first mask. In some aspects, the mask may include hard or soft edge clipping options. Hard edge clipping may be described as image cropping. Hard edge cropping may be particularly useful to remove known objects, such as the shroud of the mower or the ground surface (e.g., grass), from the image. Soft edge clipping may be described as a geometric gradient toward a boundary of the image and may also be described as a weighting mask. Any suitable type of geometric gradient or shape may be used for a soft edge clipping.

In some cases, the mask used may be static, or predetermined, and in other cases, the mask may be adaptive or adaptable based on rules. An adaptive mask may help to evaluate regions of a scene. In some aspects, an adaptive mask may establish a lower weight around regions of the image that are "saturated" in pixel intensity or irradiance. For example, the adaptive mask may help to place a lower weight (e.g., ignore) on "saturated" pixel regions associated with 255 intensity from a porch light and place a lower weight on pixels near the "saturated" region. The adaptive mask may also place a lower weight on "empty" pixel regions associated with 0 intensity as no useful information for camera capture configuration may be provided from those regions.

An irradiance image may be generated to provide irradiance image data in block 908 based on the initial image data or the masked initial image data. The irradiance image data may be generated based on calibrated irradiance map data, which may be provided in block 924, which may be stored as camera calibration data in camera configuration data in block 708 (FIG. 7) in memory of the mower 100. The calibrated irradiance map data may include data to convert pixel intensity to pixel irradiance. Each pixel in in the image data may be converted from pixel intensity to pixel irradiance in this manner. The calibrated irradiance map data may be structured as an LUT.

One or more test camera capture parameters may be determined in block 910. The test camera capture parameters may be determined based on the irradiance image data. For example, if the average irradiance is higher than an average irradiance threshold, the one or more test camera capture parameters may be selected to provide less exposure than the one or more initial camera capture parameters used to capture the initial image. In some aspects, previous test camera capture parameters stored as the camera capture configuration data in block 926 (which may also be generated from factory photometric calibration in block 702 of FIG. 7) may be used as an initial estimate of the current test camera capture parameters.

A simulated image may be generated to provide simulated image data in block 912. The simulated image of the scene may represent an estimate of image data that would be captured if the one or more test camera capture parameters were used to capture the initial image instead of the one or more initial camera capture parameters. In some aspects, the simulated image data is defined by pixel intensity.

A second mask may be applied to the simulated image to provide a masked simulated image and to generate masked simulated image data in block 914. The second mask may be the same or different than the first mask and may utilize any of the masks available to the first mask. The second mask may be applied according to a second mask configuration in block 922, which may also be stored in memory of the mower 100. In some aspects, the first mask is a hard edge clipping static mask and the second mask is a soft edge clipping, adaptive mask.

A determination whether a simulated scene parameter is acceptable may be made in block 916. An acceptable simulated scene parameter may also be described as being "well exposed." The simulated scene parameter may be determined based on the simulated image data or the masked simulated image data. Any suitable simulated scene parameter may be used to evaluate the simulated image. In some aspects, the simulated scene parameter may include or correspond to a mean of pixel intensities in the simulated image data. The simulated scene parameter may be compared to a simulated scene parameter threshold, such as a mean (or average) pixel intensity threshold. In one example, the simulated scene parameter may be acceptable when it exceeds the simulated scene parameter threshold. In another example, the simulated scene parameter may be acceptable when it falls within at least two simulated scene parameter thresholds that define at least one acceptable range.

In response to determining that the simulated scene parameter is acceptable, the method 804 may provide an update to at least one camera capture parameter of the camera capture configuration data in block 926. The at least one updated camera capture parameter may be used to capture a subsequent image for camera capture configuration or localization. In response to determining that the simulated scene parameter is not acceptable, the method 804 may return to determining one or more updated test camera capture parameters different than the one or more previous test camera capture parameters.

Any suitable technique may be used to determine the updated test camera capture parameters. In some aspects, a binary search tree may be used to determine a next, or updated, test camera capture parameter. The method 804 may continue to iterate until the test camera capture parameter provides an acceptable simulated scene parameter, until the algorithm runs out of time before the next localization image capture, until a predetermined timeout has expired, or until a determination has been made that the solution to finding the possible test camera capture parameters is diverging (e.g., not readily solvable). In such cases, a non-vision-based technique may be used to localize the mower 100. In some aspects, GPS data may be used.

In general, during camera capture configuration, test or trial camera capture parameters may be selected to be larger or smaller, such as exposure time to be either longer or shorter, than the previous camera capture parameters to drive the simulated scene parameter to a target value. An exposure time search window to something reasonable for an application, such as 30 microseconds to 12 seconds for mowing applications.

The active lighting intensity may also be balanced with exposure time and gain in a similar manner. One or more of the exposure time, gain, and active lighting intensity parameters may also be selected or limited by the range of camera controls for the particular machine (e.g., cameras having a maximum exposure time or gain or a maximum active lighting power).

In some aspects, the effect of camera gain may be used effectively as a multiplier on the exposure time. In general, high gain may be undesirable and very long exposure times may also be undesirable. The two camera capture parameters may be balanced. In other words, the calculated, or nominal, exposure time, may be converted to a combination of parameters. For example, if the selected exposure time is less than a threshold (e.g., 2 seconds), then gain may be set to 0 dB and exposure time may be set to the calculated value. If the calculated exposure time is greater than the threshold, then the exposure time may be reduced and set to the threshold (e.g., 2 seconds) and the gain may be selected to the correct value to effectively multiply the reduced exposure time up to the calculated exposure time. For example, a calculated exposure time may be 8 seconds, and the resulting camera capture parameters may be 2 seconds of exposure time and 12 dB of gain.

Thus, various embodiments of autonomous machine navigation in lowlight conditions are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety for all purposes, except to the extent any aspect directly contradicts this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The terms "coupled" or "connected" refer to elements being attached to each other either directly (in direct contact with each other) or indirectly (having one or more elements between and attaching the two elements). Either term may be replaced to "couplable" or "connectable" to describe that the elements are configured to be coupled or connected. In addition, either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The phrases "at least one of," "comprises at least one of," and "one or more of" followed by a list refers to any one of the items in the list and any combination of two or more items in the list.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

In general, the terms "aspect" and "embodiment" may be used interchangeably to describe one or more examples of the present disclosure. Reference to "one embodiment," "an embodiment," "certain embodiments," or "some embodiments," etc., means that a particular feature, configuration, composition, or characteristic described in connection with the embodiment (or aspect) is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

What is claimed is:

1. A method for automatic camera capture configuration of a vision and navigation system of an autonomous machine comprising:
   capturing image data of a scene using one or more cameras of the autonomous machine configured with at least one initial camera capture parameter that comprises one or more of exposure time, gain, and active lighting intensity;
   comparing pixel intensities of the image data to a pixel intensity threshold to determine if the image data is well exposed;
   generating irradiance image data based on applying a calibrated irradiance map to estimate scene brightness of the image data;
   generating simulated image data based on an estimate of the image data that would be captured in view of the estimated scene brightness if a test camera capture parameter was used to capture the image data instead of initial camera capture parameter;
   determining a simulated pixel intensity from the simulated image data; and
   generating at least one updated camera capture parameter based on the test camera capture parameter in response to determining that the simulated pixel intensity is well exposed.

2. The method according to claim 1, wherein the test camera capture parameter comprises at least one previously stored camera capture parameter.

3. The method according to claim 1, further comprising:
   using the at least one initial camera capture parameter for capturing a localization image in response to determining that the image data is well exposed; and
   generating the irradiance image data in response to determining that the image data is not well exposed.

4. The method according to claim 1, wherein determining that the simulated pixel intensity is well exposed comprises comparing the simulated pixel intensity to a mean pixel intensity threshold or the simulated pixel intensity is within a band of ranges of mean pixel intensities.

5. The method according to claim 1, wherein the pixel intensities comprise one or more of the following: a mean pixel intensity, a median pixel intensity, or a weighted sum of pixel intensities.

6. The method according to claim 1, further comprising:
   generating masked captured image data based on the image data of the scene in response to determining that parts of the image data have excessively high or low pixel intensities; and
   generating the irradiance image data based on the masked captured image data.

7. The method according to claim 1, further comprising:
   generating masked simulated image data based on the simulated image data of the scene; and
   determining the simulated pixel intensity based on the masked simulated image data.

8. The method according to claim 1, wherein determining that the simulated pixel intensity is well exposed comprises determining the simulated pixel intensity exceeds a mean pixel intensity threshold.

9. The method according to claim 1, wherein the simulated pixel intensity comprises one or more of the following: a mean pixel intensity, a median pixel intensity, or a weighted sum of pixel intensities.

10. The method according to claim 1, wherein generating the at least one updated camera capture parameter comprises iteratively performing a search loop comprising:
    using a different test camera capture parameter in response to determining that the simulated pixel intensity is not well exposed;
    generating different simulated image data of the scene based on the different test camera capture parameter; and
    determining whether the different simulated image data is well exposed.

11. The method according to claim 1, wherein the different test camera capture parameter comprises one or more of the following: exposure time, gain, and active lighting intensity.

12. The method according to claim 1, wherein the different test camera capture parameter comprises a calculated exposure time, the method further comprising:
    in response to the calculated exposure time exceeding an exposure time threshold,
       using a reduced exposure time as a first camera capture parameter that does not exceed the exposure time threshold, and
       using a gain as a second camera capture parameter based on the calculated exposure time and the reduced exposure time.

13. The method according to claim 1, further comprising using the at least one updated camera capture parameter in a subsequent image data capture using the one or more cameras to configure the one or more cameras or to update a localization.

14. The method according to claim 1, further comprising:
    capturing the image data of the scene during movement of the autonomous machine in lowlight conditions in a work region;
    determining whether to update a localization of the autonomous machine during the movement of the autonomous machine;
    reducing the movement of the autonomous machine in response to determining to update the localization;
    capturing an operational image of at least a portion of the work region in the lowlight conditions while the movement of the autonomous machine is reduced using the at least one updated camera capture parameter;
    updating a pose estimate of the autonomous machine based on the captured operational image; and
    resuming the movement of the autonomous machine within the work region based on the updated pose estimate.

15. The method according to claim 1, further comprising:
    determining an uncertainty parameter based on a current pose;
    determining whether the uncertainty parameter exceeds an uncertainty threshold;
    reducing movement of the autonomous machine in response to the uncertainty parameter exceeding the uncertainty threshold and determining to update a localization of the autonomous machine; and
    capturing an operational image of at least a portion of a work region while the movement of the autonomous machine is reduced.

16. The method according to claim 15, wherein the uncertainty threshold is determined based on a distance from a boundary of the work region.

17. An autonomous machine comprising:
    a housing coupled to a maintenance implement;
    a propulsion system including at least one motor;
    at least one camera adapted to record images in one or more light conditions; and a controller operably coupled to the at least one camera and the propulsion system, the controller adapted to carry out the method according to claim 1.

18. A non-transitory computer-readable medium comprising instructions stored thereon that, when executed by processing circuitry, cause the processing circuitry to perform a method according to claim 1.

19. The method according to claim 1, wherein the image data is captured while the autonomous machine is moving.

20. The method according to claim 19, wherein capturing the image data while the autonomous machine is moving results in motion blur in the image data, wherein the motion blurred image is used to generate the at least one updated camera capture parameter to improve the image data for localization of the autonomous machine.

21. The method according to claim 1, wherein the calibrated irradiance map is generated by a calibration test performed on one or more image sensors or camera boards and stored as camera configuration data on the autonomous machine, measurements of the calibration test applying to all cameras of a model of the one or more image sensors or the camera boards.

\* \* \* \* \*